W. HEDGES.
Evaporating Pan.
No. 26,325.
Patented Nov. 29, 1859.
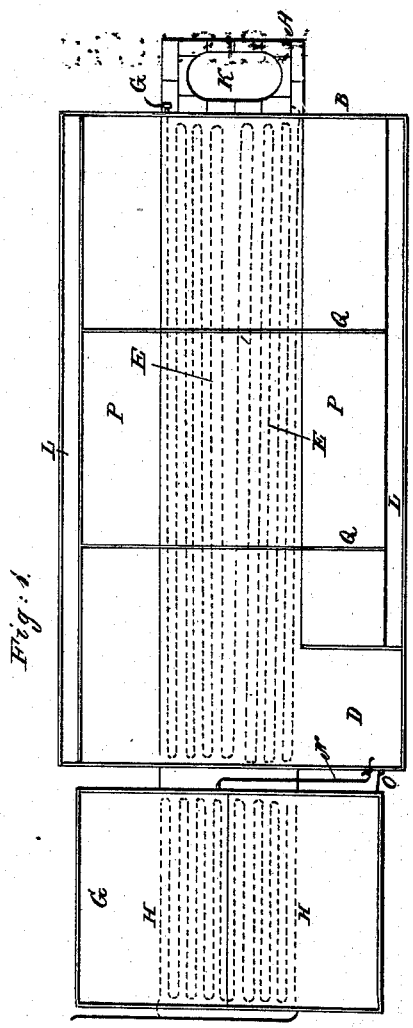
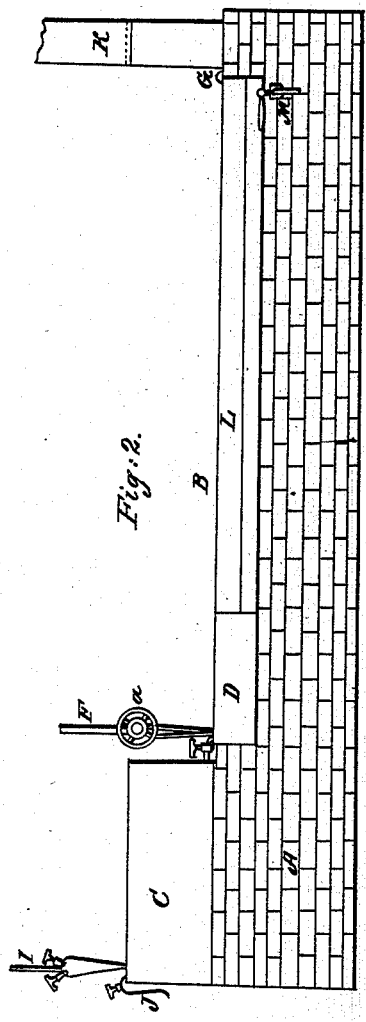
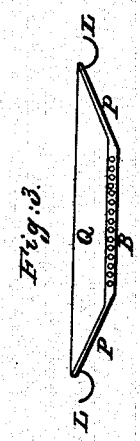
Witnesses:
Henry Killmer
Charles Hitchism
Inventor:
Wheeler Hedges

UNITED STATES PATENT OFFICE.

WHEELER HEDGES, OF CHICAGO, ILLINOIS, ASSIGNOR TO HIMSELF AND P. W. GATES, OF SAME PLACE.

IMPROVEMENT IN PANS FOR EVAPORATING SUGAR-JUICE.

Specification forming part of Letters Patent No. 26,325, dated November 29, 1859.

*To all whom it may concern:*

Be it known that I, WHEELER HEDGES, of Chicago, in the county of Cook and State of Illinois, have invented a new and Improved Evaporator; and I do hereby declare that the following is a full, clear, and exact description of the construction and operation of the same, reference being had to the annexed drawings, making a part of this specification, in which—

Figure 1 is a bird's-eye view of the same. Fig. 2 is a side elevation. Fig. 3 is a transverse section of the evaporating-pan, showing the pipes E E and side of the stops Q and troughs L and L.

The letters of reference refer to the same parts in each figure.

A is the arch. It is made of brick, when most convenient, and wide enough to allow the horizontal bottom of the pan to come to the insides, and long enough to support the pan and the heaters, and high enough to allow sufficient fire-box and grate-bars for the kind of fuel used.

B is the evaporating-pan, of any convenient size, made with a horizontal bottom, with the length about six times the width of the bottom, and of copper or other suitable material. The sides should be about eighteen inches wide, and united to the bottom at the inner and lower edge, with the outer edge raised above the plane of the bottom about five inches, thus forming flatly-flared sides or beaches that extend outward beyond the arch, so as not to be exposed to the intense heat, thus causing the foam to condense as it flows out toward the edge of the sides. The end of the pan may be vertical and about five inches in height. The discharging end of the pan should be about three-eighths of an inch the lowest.

C and C are heating-receivers, made square in form and any capacity required. The two, when placed side by side, should be about twice the width of the inside of the arch, and should be placed at the end of the pan B, enough higher than the top of the pan, so that their contents may be discharged into the pan B.

D is a defecating-apartment of the evaporating-pan. Its bottom should be on the same plane with the bottom of the pan. The sides are as high as the sides of the pan. It is square in form, and the size should be about the same as the width of the bottom of the pan, without any separating-partition, thereby allowing a free passage between them, and the whole must project outside of the arch, so as to be but slightly acted upon by the heat.

E and E are separate layers of steam-pipes made of any suitable metal. The steam is conducted into these pipes by the pipe F, which is provided with a regulating-valve, *a*. This pipe extends to the middle of the end next to the heaters, where it branches and is united with the pipes E and E at the points O O. These two pipes extend the entire length of the bottom. One is there turned to the right and the other to the left, and both return back to the same end they started from, thus returning and re-returning until the bottom of the pan is covered or the amount of pipe is laid that is required. The finishing ends of both pipes pass out of the pan and are provided with stop-cocks to regulate the discharge of the condensed steam.

F is a steam-pipe that conducts the steam from the generator to the pipes E and E.

G is a stop-cock at the end of the pipes E and E.

H and H are steam-pipes laid in the bottom of the heaters C and C, in a similar manner to the pipes E E. These pipes are intended to be supplied with the exhaust-steam from the engine. These pipes are used to warm the cold fluid before it enters the defecator D, and to condense the waste steam, thereby saving the water in a heated state to be used again.

I is the inducting-pipe that conducts the steam into the pipes H and H.

J is the eduction-pipes, provided with stop-cocks to discharge the condensed steam from the pipes H and H.

K is a chimney for the arch.

L and L are troughs placed under or attached to the sides of the pan P P. Their use is to receive the scum that is scraped off the sides P P, thus saving it for vinegar or other purposes.

M is a discharge-faucet used to draw off the contents of the evaporating-pan B.

N and O are pipes provided with faucets that conduct the contents of the heaters into the defecator D.

P and P are the broad flaring sides or beaches of the evaporating-pan.

Q and Q are stop-boards fitted to the inside of the pan B, and are used loosely. Their use is to prevent the foam passing too freely from one end of the pan to the other.

To use my invention for evaporating cane-juice for making sirup or sugar, fill the heaters, then let the steam into the pipes H H. When the juice is sufficiently heated, draw it into the defecator and pan until the pipes E E are nearly covered, then let the steam into the pipes E and E, when a powerful ebullition will commence, and by means of the direct steam entering the middle pipes first, that portion will be the hottest, so that this and the flaring sides P and P will cause the foam of the boiling juice to rise highest in the middle and flow toward the sides P and P, where the remaining scum will collect, and can be readily removed with a scraper into the troughs, thereby effectually eradicating all substances that would injure the quality of the sirup or sugar.

The peculiar construction and operation of the defecator D is such that by reason of the remoteness from the heat of that part of the defecator D where the juice is received no ebullition takes place; still it is kept near the boiling-point. Consequently as fast as the juice falls in an almost immediate and perfect defecation takes place. The green scum is prevented from flowing out of the defecator by the strong current of ebullition setting in, enabling me to remove the scum before it is boiled in the sirup, thereby avoiding the deleterious influence that would ensue by extracting the juice of the fibrous substance or scum.

It being impossible to make a good article of sirup or sugar without a rapid evaporation, I have provided a fire apparatus, as above specified, to aid the steam to facilitate the evaporation, when required, and it may be used separately when the steam apparatus should be injured by accident or could not be conveniently used, so that the manufacturer could proceed with his business. When the above operation has progressed a short time, the sirup at the discharging end of the pan will be of a proper density to draw off by means of the discharge-faucet, as fast as the sirup or sugar acquires the proper density, always endeavoring to keep the sirup about one inch deep in the pan.

What I claim as my invention, and desire to secure by Letters Patent, is—

1. The arrangement of the pipes E E with the pipe F in the pan B, so that the application of the steam to the pipes E E will cause the greatest ebullition, and the foam to rise highest longitudinally in the middle of the pan B, for the purpose of causing all impurities to be deposited upon the flaring sides P P of the pan B.

2. The construction and application of the flaring sides or beaches P and P, that by their great obliqueness retain all the scum thrown upon them, substantially as specified.

3. The construction and application of the defecator D, in combination with an evaporator, substantially as specified, and for the purpose herein set forth.

4. The stop-boards Q Q, in combination with the evaporator, as described, and for the purpose set forth.

WHEELER HEDGES.

Witnesses:
HENRY KOLLMER,
CHARLES KETCHUM.